United States Patent [19]

Stokes

[11] 4,225,920
[45] Sep. 30, 1980

[54] OPERATOR INDEPENDENT TEMPLATE CONTROL ARCHITECTURE

[75] Inventor: Richard A. Stokes, West Chester, Pa.

[73] Assignee: Burroughs Corporation, Detroit, Mich.

[21] Appl. No.: 941,193

[22] Filed: Sep. 11, 1978

[51] Int. Cl.² .................. G06F 9/16; G06F 13/00
[52] U.S. Cl. ................................................ 364/200
[58] Field of Search ... 364/200 MS File, 900 MS File, 364/736

[56] References Cited

U.S. PATENT DOCUMENTS

| | | | |
|---|---|---|---|
| 3,544,973 | 12/1970 | Borck, Jr. et al. | 364/200 |
| 3,634,828 | 1/1972 | Myers et al. | 364/200 |
| 3,787,673 | 1/1974 | Watson et al. | 364/736 |
| 3,815,095 | 6/1974 | Wester | 364/200 |
| 3,875,391 | 4/1975 | Shapiro et al. | 364/736 |
| 3,900,836 | 8/1975 | Salvo | 364/200 |
| 4,025,771 | 5/1977 | Lynch, Jr. et al. | 364/736 |
| 4,101,960 | 7/1978 | Stokes et al. | 364/200 |

*Primary Examiner*—Melvin B. Chapnick
*Attorney, Agent, or Firm*—Leonard C. Brenner; Edmund M. Chung; Kevin R. Peterson

[57] ABSTRACT

In a microprogrammed data processing pipeline system comprising a plurality of stages, microinstructions for controlling the stages are stored as templates in an addressable template micromemory store and are provided automatically and sequentially to the stages of the pipeline system. Operation microcode is introduced for a particular stage after the templates are issued from the micromemory store but before provision thereof to the pipeline system, thereby allowing a single template to control a plurality of different operations of a particular stage within the pipeline system. Provision is also made to freeze or inhibit the issuance of subsequent templates during the execution of excessively long operations in the particular stage.

5 Claims, 9 Drawing Figures

Fig. 5

| | TIME | | | | | | | | | |
|---|---|---|---|---|---|---|---|---|---|---|
| | 1 | 2 | 3 | 4 | 5 | 6 | 7 | 8 | 9 | 10 |
| STAGE 1 | A | B | C | | | | | | Z | |
| STAGE 2 | | A | B | C | | | | | | |
| STAGE 3 | | | | $OP1_6$ | $OP1_0$ | $OP2_6$ | $OP2_0$ | | | |
| STAGE 4 | | | | | | | | Z | | |

TRAID $Z = (A\ OP_1\ B)\ OP_2\ C$

Fig. 6

| | TIME | | | | | | | | | |
|---|---|---|---|---|---|---|---|---|---|---|
| | 1 | 2 | 3 | 4 | 5 | 6 | 7 | 8 | 9 | 10 |
| STAGE 1 | A | B | C | | | | | | Z | |
| STAGE 2 | | A | B | C | | | | | | |
| STAGE 3 | | | | + | + | * | * | | | |
| STAGE 4 | | | | | | | | Z | | |

TRAID $Z = (A+B)*C$

Fig. 7

| | TIME | | | | | | | | | |
|---|---|---|---|---|---|---|---|---|---|---|
| | 1 | 2 | 3 | 4 | 5 | 6 | 7 | 8 | 9 | 10 |
| STAGE 1 | A | B | C | | | | | | Z | |
| STAGE 2 | | A | B | C | | | | | | |
| STAGE 3 | | | | * | * | − | − | | | |
| STAGE 4 | | | | | | | | Z | | |

TRAID $Z = (A*B) - C$

Fig. 8

| | TIME | | | | | | | | | | |
|---|---|---|---|---|---|---|---|---|---|---|---|
| | 1 | 2 | 3 | 4 | 5 | 6 | 7 | 8 | 9 | 10 | 11 |
| STAGE 1 | A | B | C | | | | FR | FR | | | Z |
| STAGE 2 | | A | B | C | | | FR | FR | | | |
| STAGE 3 | | | | + | + | / | / | / | / | | |
| STAGE 4 | | | | | | | FR | FR | | Z | |

TRAID $Z = (A+B)/C$

OPERATOR INDEPENDENT TEMPLATE CONTROL ARCHITECTURE

REFERENCE TO RELATED APPLICATIONS

In co-pending application, Ser. No. 838,070 for a "Template Micromemory Structure for a Pipelined Microprogrammable Date Processing System", filed in the names of R. K. Gupta and C. R. Vora and assigned to the assignee of the present invention, there is described and claimed a template micromemory storage method and apparatus. In co-pending application, Ser. No. 853,518, now U.S. Pat. No. 4,159,519 issued June 26, 1979, for a "Template Family Interfacing Structure for Providing a Sequence of Microinstructions to a Pipelined Microprogrammable Data Processing System." filed in the name of R. K. Gupta and assigned to the assignee of the present invention, there is described and claimed a method and structure for forming and issuing a sequential plurality of templates in an efficient collision-free manner. The present invention, although not limited thereto, may be used in conjunction with the above-mentioned methods and structures.

BACKGROUND OF THE INVENTION

In the area of data processors, a pipeline system is a system having computational and combinational capabilities divided into several sequential stages, each of which may be active with an independent set of data at the same instant of time. Data is viewed as flowing from one pipeline stage where it is acted upon or processed to another for further action or processing. To increase pipeline throughput new data is fed to the first stages thereof while old data is still being acted upon in the latter stages. Maximum throughput wherein all stages are busy all of the time is a goal seldom achieved in any pipeline system over an extended period of time.

Often the pipeline system is microprogrammable wherein each stage thereof responds to microinstructions. For example, an arithmetic element stage may respond to microinstructions requesting arithmetic operations such as add, divide, multiply, etc., and to other control instructions requesting Boolean operations to be performed. A simple memory stage may be requested by a control microinstruction to read from a particular address, and to output to a particular bus, register or stage, or to store data in a particular address.

In microprogrammable pipeline system design striving to maximize throughout, the task of providing the proper control microinstructions to the various stages in correct sequential order becomes quite complex, see "The Microprogramming of Pipelined Processors", P. M. Kogge, THE FOURTH ANNUAL SYMPOSIUM ON COMPUTER ARCHITECTURE, pp 63-69.

In a large pipelined system comprising a plurality of microprogrammable stages, microinstructions for controlling the stages may be stored as templates in an addressable template micromemory store to be provided automatically and sequentially to the stages of the pipeline system. See, for example, U.S. Pat. No. 4,101,960, issued July 18, 1978 in the name of R. A. Stokes et al disclosing and claiming therein a scientific processor utilizing a parallel pipeline array under template control.

However, for a complex pipeline system capable of performing a vast number of different operations, the number of templates and therefore the size of the template micromemory store becomes increasingly large and expensive to implement. Further, the template structure is quite inflexible when each stored template specifies the specific operation to be performed by a pipelined stage. In such a system, the introduction of new and different operations for execution by the pipelined stages, no matter how simple, requires an addition or change to the template micromemory structure and associated hardware.

OBJECTS AND SUMMARY OF THE INVENTION

It is therefore an object of the invention to provide an operator independent template control structure for maximizing the functional flexibility of the template micromemory store.

It is another object of the invention to provide a template control structure wherein a single template stored in memory may be individually coupled therefrom with a plurality of operators to provide control instructions for a plurality of operations within a pipelined system.

The above and other objects and features of the present invention are realized an an operator independent template control architecture having a plurality of microinstruction control templates stored in a memory to be read therefrom as required for control of stages in a pipelined system. Operators are introduced after the templates are read from micromemory and before the control information resulting therefrom is provided to the pipelined system thereby allowing a single template to control a plurality of different operations within the pipelined system.

The system configuration and operational details given above have been presented in simplified form. The foregoing and other objects, features and advantages of the invention will be apparent from the following more particular description of a preferred embodiment of the invention illustrated in the accompanying drawings.

BRIEF DESCRIPTION OF THE DRAWINGS

FIG. 5 is a diagram illustrating the functioning of a first template as stored in the template micromemory with operator pointers in the architecture of FIG. 2;

FIG. 6 is a diagram illustrating the functioning of the template of FIG. 5 with OP1 equalling addition and OP2 equalling multiplication;

FIG. 7 is a diagram illustrating the functioning of the template of FIG. 5 with OP1 equalling multiplication and OP2 equalling subtraction; and FIG. 8 is a diagram illustrating the functioning of the template of FIG. 5 with OP1 equalling addition and OP2 equalling division.

DESCRIPTION OF THE PREFERRED EMBODIMENT

Figure 1:
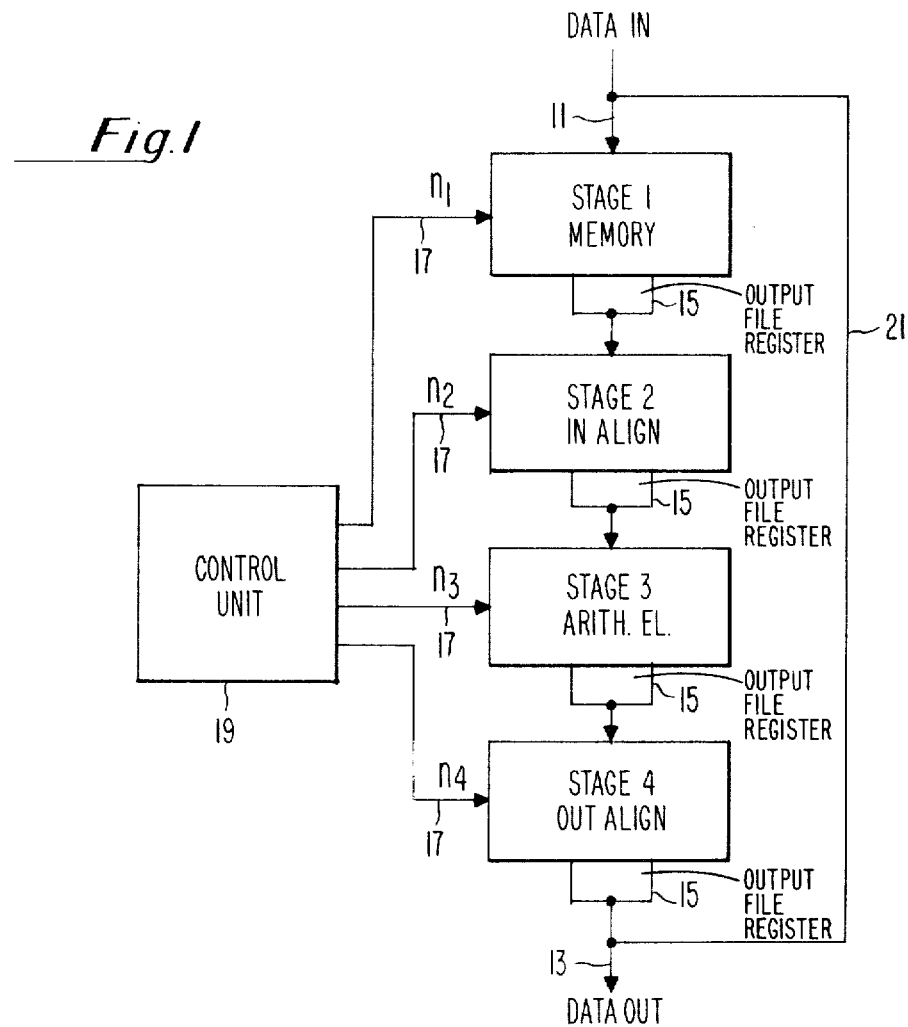
FIG. 1 is a diagram of a pipelined system controllable by the operator independent template control architecture of the present network.

The operator independent template control architecture of the preferred invention functions in the control and processing of the flow of data through a plurality of microprogrammable stages, see FIG. 1. Data is inputted into Stage 1 through data input channel 11 and pipelined successively through Stages 2, 3 and 4 to data output channel 13. A feedback path 21 permits recycling of data to Stage 1. Each Stage 1-4 has an associated output file register 15 to facilitate data flow to the successive stage or to the data output channel 13. Each Stage 1-4 also includes a control input 17 for received microcoded instructions n1 through n4 respectively, from a controlling unit 19.

In U.S. Pat. No. 4,101,960, for a "Scientific Processor", issued July 18, 1978, in the names of R. A. Stokes et al and assigned to the assignee of the present invention, Stages 1 through 4 of the present invention are realized as the memory, input alignment, processing and output alignment stages of a parallel processor. The present invention may be employed with either parallel or serial processors, as long as each stage thereof is microprogrammable and all stages together function in a pipelined function regarding data flow and processing.

Each pipeline Stage 1-4 responds to microcoded instructions applied to its control input 17. For example, microcode instruction n1 may direct Stage 1 to store data from the data input channel 11 or to transfer data to Stage 2. The address of the data to be stored or transferred need not be supplied with the code instruction n1 as the address may readily be supplied from some other source (not shown).

Data flows through Stages 1 through 4 under template control, see for example, U.S. Patent application Ser. No. 838,070, filed Nov. 17, 1977 in the name of R. Gupta et al. Templates may be fashioned together as families for an efficient collision-free issuing of a sequential plurality of templates, see U.S. Pat. application Ser. No. 853,518 filed Nov. 21, 1977 in the name of R. Gupta, now U.S. Pat. No. 4,159,519 issued June 26, 1979.

Figure 2:
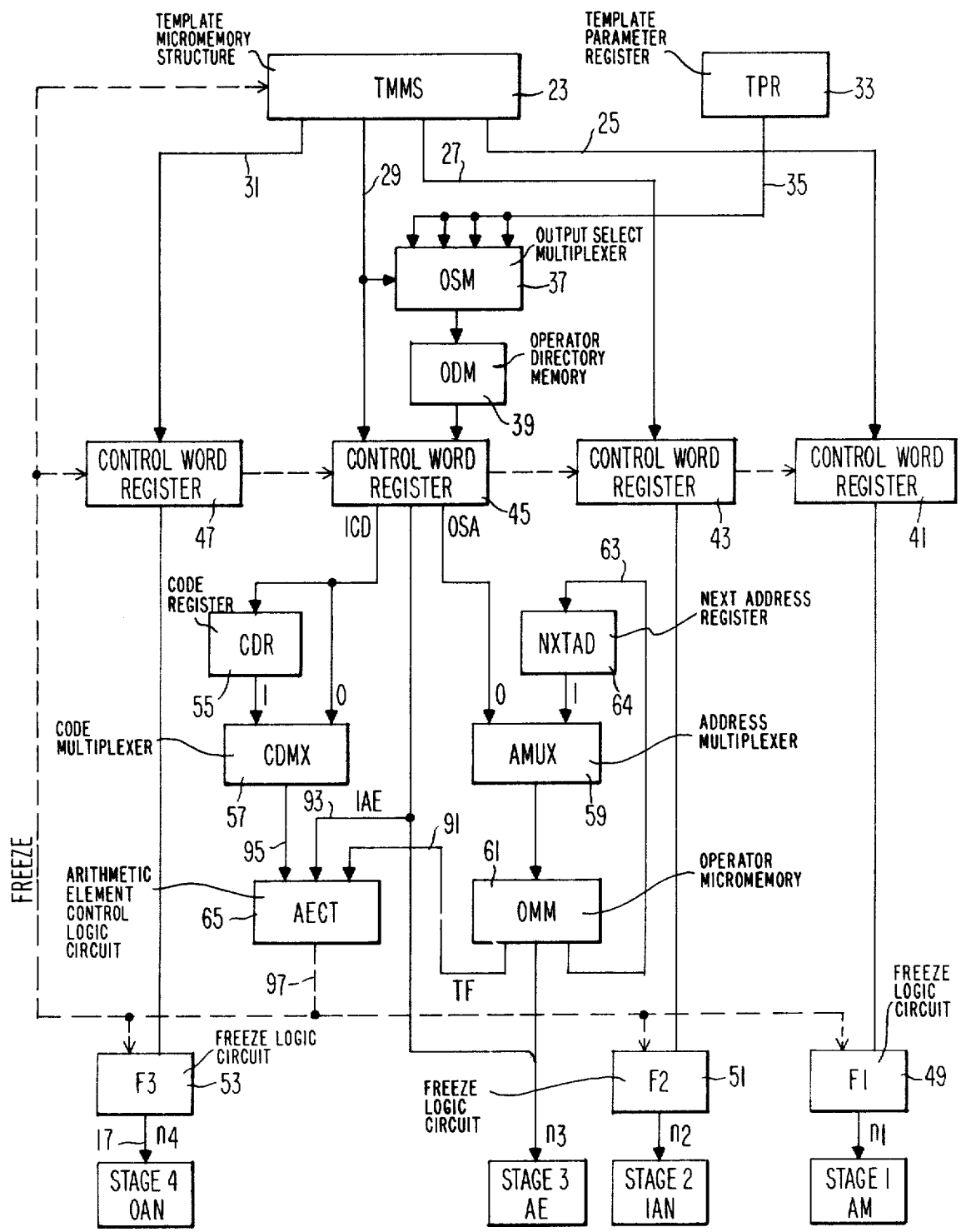
FIG. 2 is a diagram of the operator independent template control architecture of the present invention.

In the preferred embodiment, see FIG. 2, templates are issued in a fashion to permit the introduction of operators for defining the operation of the Stage 3 arithmetic elements. As will be described below, standard operations (i.e., those requiring two clock periods) are handled routinely and long operations (i.e., those requiring over two clock periods for execution) are processed via the procedure of pipeline freezing. Templates are addressably stored and read from a template micromemory structure 23, see co-pending application Ser. No. 838,070, filed Nov. 17, 1977. The template micromemory structure 23 outputs on line 25 a microinstruction code word for the pipeline Stage 1, on line 27 a microinstruction code word for the pipeline Stage 2, on line 29 a microinstruction code word for the pipeline Stage 3 and on line 31 a microinstruction code word for pipeline Stage 4.

A template parameter register 33 contains four OP codes for four arithmetic element operators. These OP codes may be specified by a users program and may specify for example, operations such as add, subtract, multiply, and divide. The four OP codes are fed via bus 35 to an operator select multiplexer 37 which selects one of the four OP codes in accord with a two bit selection code provided on output bus 29 from the template micromemory structure 23. The OP code selected by the operator select multiplexer is used to generate an operator micromemory address via an operator directory memory 39. The operator directory memory 39 merely converts OP codes into operator starting addresses (OSA) and may be physically realizable as a random access memory.

The template micromemory structure 23 outputs on lines 25, 27, 29, and 31 are fed respectively to control word registers 41, 43, 45, and 47 for temporary storage. Also feeding control word register 45 is the address outputted from the operator directory memory 39. Control data is passed from control word registers 41, 43, and 47 to freeze logic circuits 49, 51, and 53 for controlling pipeline Stage 1, Stage 2, and Stage 4, respectively. Each freeze logic circuit 49, 51, and 53 functions to pass a control word therethrough to its associated pipelined stage and to disable its associated stage initiate signal when a FREEZE control signal is TRUE (or logical 1). The generation and significance of the FREEZE control signal will be detailed hereinafter.

The control word register 45 feeds control bits (minus the operator bits) to the pipeline Stage 3. Also the control word register 45 feeds a three-bit initiate code (representing numerically the numbers 0 through 7) to a code register 55 and to a code multiplexer 57 which selects either the initiate code stored in the code register 55 or the new initiate code for the next operation stored in the control word register 45.

The control word register 45 also feeds the operator starting address (OSA) provided by the operator directory memory 39 to an address multiplexer 59. The address multiplexer 59 addresses an operator micromemory 61 to generate the actual operation control bits for the pipeline Stage 3. The operator micromemory 61 is realized in the preferred embodiment as a read-only-memory (ROM) but in alternate embodiments as random-access memory (RAM) or other storage devices could be used. The address fed to the operator micormemory 61 returns the next address by feedback path 63 to a next address register 64. The address multiplexer 59 thus selects an operator starting address from the control word register 45 at the start of an operation and subsequent addresses from the next address register 64 during the execution of the operation.

The operator micromemory 61 also generates a Time-to-Finish (TF) signal for an Arithmetic Element Control Logic Circuit 65. The TF signal is a three-bit signal indicating numerically from 0 to 7 the number of cycles required to complete the particular operation being read from the Operator Micromemory 61 and being provided to the pipeline Stage 4.

The Arithmetic Element Control Logic Circuit 65 also receives an Initiate Arithmetic Element (IAE) bit from the control word register 45 and a three-bit initiate code (ICD) word via the code multiplexer 57. The three-bit initiate code word is derived at the initiation of an operation from the code word register 45 and subsequently from the code register 55 wherein it is stored for the duration of an operation. Table 1 illustrates the functions of the IAE and ICD codes:

TABLE 1

| IAE | ICODE | FUNCTION |
|---|---|---|
| 0 | X | NO-OP instruction |
| 1 | 0 | continue until end |
| 1 | 1 | continue for 1 cycle |

TABLE 1-continued

| IAE | ICODE | FUNCTION |
|---|---|---|
| 1 | 2 | continue until 2 cycles left |
| 1 | 3 | continue until 3 cycles left |
| 1 | 4 | continue until 4 cycles left |
| 1 | 5 | Initiate for 1 cycle |
| 1 | 6 | Initiate until 1 cycle left |
| 1 | 7 | Initiate until end |

Figure 3:
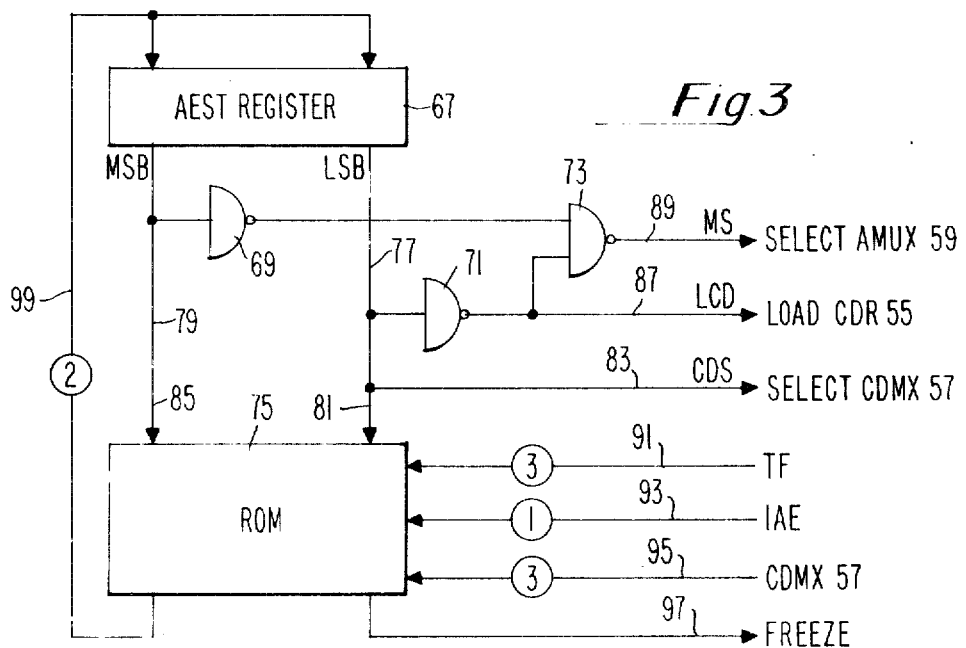
FIG. 3 is a diagram of an arithmetic element control logic system used in the architecture of FIG. 2.

The arithmetic control logic circuit 65 comprises a two-bit register 67, two inverters 69 and 71, NAND gate 73, and a memory 75, see FIG. 3. The two-bit register 67 has a LSB output 77 and a MSB output 79. The LSB output 77 feeds the inverter 71, provides one input 81 to the memory 75, and generates the code multiplexer (CDMUX) 57 select signal on the CDS line 83. The MSB output 79 feeds inverter 69 and an input 85 to the memory 85. The inverter 71 provides a logic signal for loading the code register 55 on the LCD line 87. The NAND gate 73 fed by both inverters 69 and 71, generates the address multiplexer (AMUX) 59 select signal on the MS line 89. A logical 1 on the MS line 89 causes the address stored in the Next-Address Register 64 to be fed through the Address Multiplexer 59 to the Operator Micromemory 61. Likewise, a logical 1 on the CDS line 83 causes the address stored in the Code Register 55 to be fed through the code multiplexer (CDMUX) 57 to the arithmetic element control logic (AECT) 65.

The memory 75, preferably realized as a read-only memory, also receives a three-bit code on the Time-to-Finish (TF) bus 91, a single bit on the Initiate Arithmetic Element (IAE) line 93, and a three-bit signal on the Code Multiplexer Bus 95. The memory 75 generates the Freeze signal on the Freeze Line 97 and provides a two-bit control signal to the register 67 on bus 99.

Figure 4A:
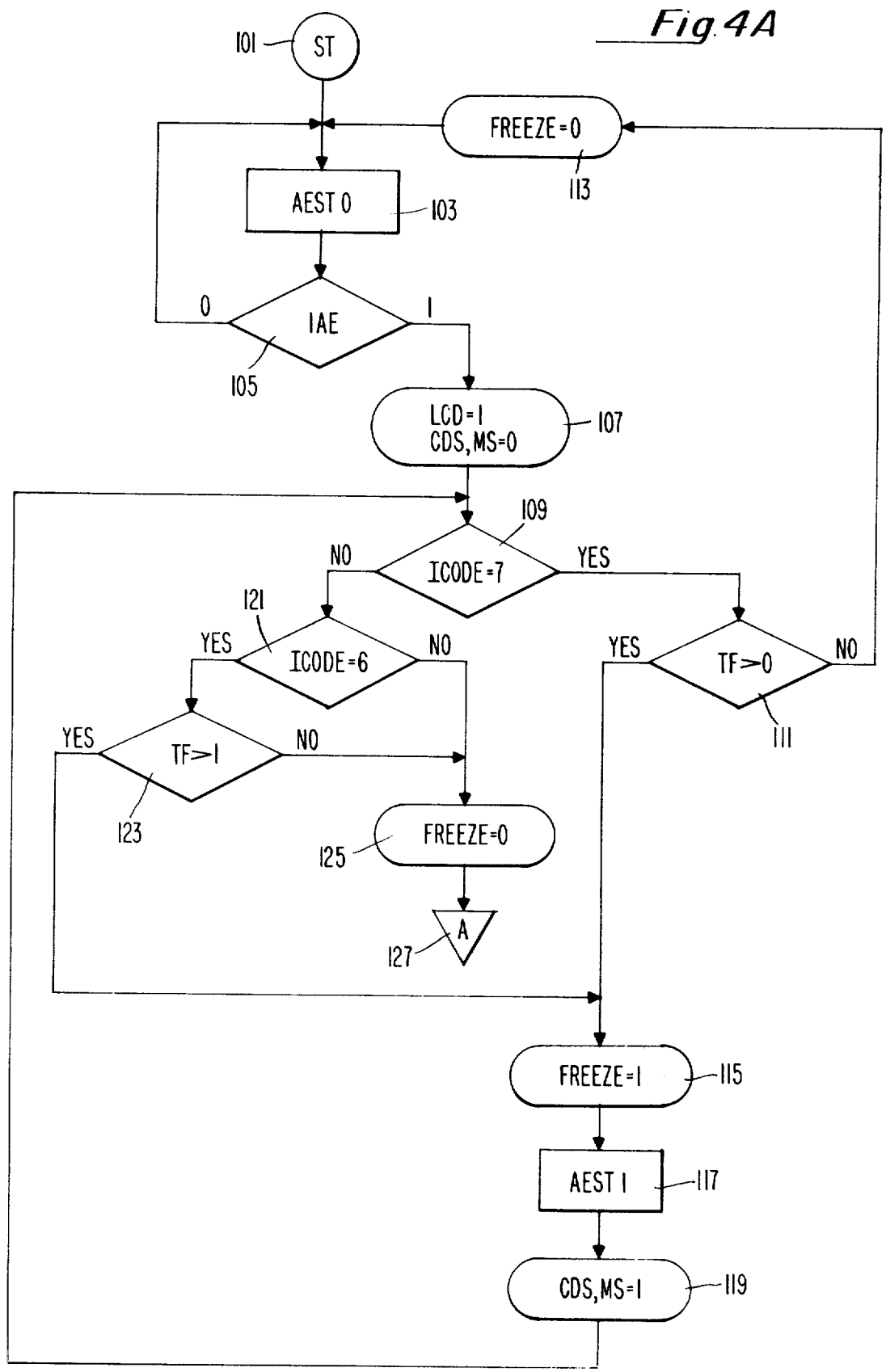
FIGS. 4A and 4B are flow diagrams illustrating the functioning of the arithmetic element control logic system of FIG. 2.
Figure 4B:
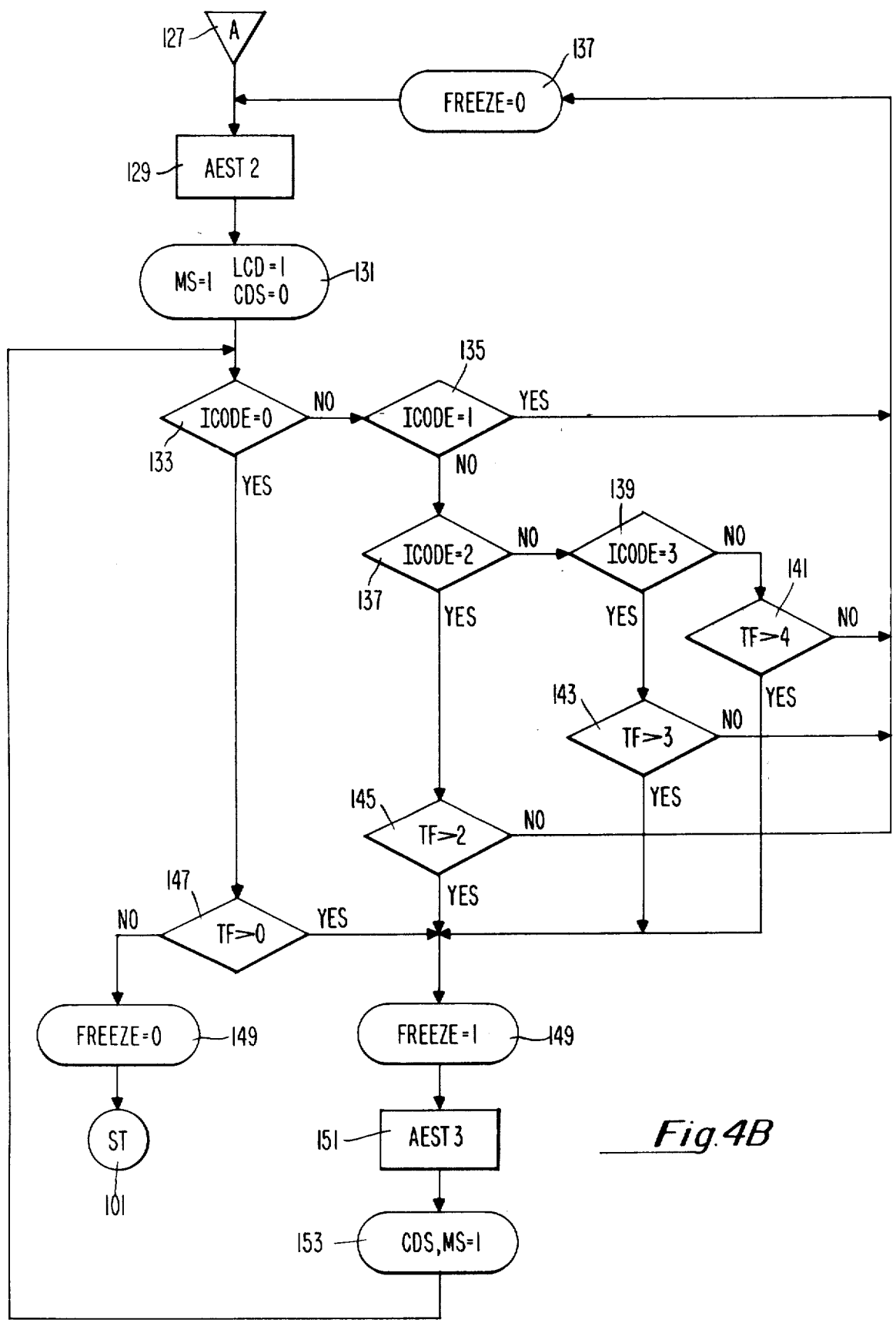

The function of memory 75 and the operation of the entire arithmetic element control logic 65 may best be understood with reference to the flow charts of FIG. 4A and FIG. 4B.

With reference to FIG. 4A a start position 101 is formed and at the first clock pulse thereof the arithmetic element start register is at condition zero as shown by block 103. Under these conditions an initiate arithmetic unit decision or test is made as represented by the AIE diamond 105. If the initiate AE bit is zero, then no action occurs. However, if and when the initiate arithmetic element bit becomes a logical 1, then the following conditions are set as indicated by 107: a logical 1 is present in the LCD line, and a logical zero is present on both of the MS line 89 and the CDS line 83. A test is made thereafter to query as to whether the ICODE is equal to 7 as indicated in decision diamond 109. If ICODE is equal to 7 as indicated on input line 95 to the ROM 75, then a test is made as to whether the Time-to-Finish (TF) is greater than zero cycles as indicated on the TF line 91 and shown in the decision diamond 111. If the Time-to-Finish is not greater than zero, then the Freeze output on freeze line 97 remains at zero as shown by status oval 113 and the system is ready for another start as indicated by the start circle 101. If the Time-to-Finish is greater than zero, then a Freeze signal equal to one is generated on freeze line 97 as shown in the oval 115 and the arithmetic element start register 67 is set to condition No. 1 as shown in block 117 wherein the conditions are set leaving a logical 1 on the CDS line 83 and a logical 1 on the MS line 89 as shown by oval 119.

Again a test or a decision is made as to whether ICODE is equal to 7 as indicated in decision rectangle 109. If ICODE does not equal 7 then a test is made to determine whether ICODE is equal to 6 as indicated in decision block 121. IF ICODE equals 6, then a test comparison is made to determine whether the Time-to-Finish is greater than one as indicated in decision block 123. If the Time-to-Finish is greater than one, then control recycles through the situation where the freeze is set to one as shown by oval 115 and the arithmetic element start register is set again to one as shown in block 117. If however ICODE does not equal 6 in decision block 121, or the Time-to-Finish is not greater than one in block 123, then the freeze remains at zero as indicated at oval 125 and the process continues as indicated in A triangle 127 on FIG. 4A and also on FIG. 4B.

The arithmetic element start register is then set to 2 as indicated in block 129 which sets the conditions indicated in oval 131 wherein MS and LCD equal one, and CDS equals zero. Following this, the test is made to determine whether ICODE equals zero is indicated in decision triangle 133. If ICODE does not equal zero, a test is made to determine whether ICODE equals one, as indicated in decision triangle 135. If it is, then freeze is set at zero as indicated in oval 137 and control is returned to block 129 wherein the arithmetic element start register is set to 2. If ICODE does not equal 1, as tested by decision block 135, then a test is made to determine whether ICODE equals 2, as indicated in decision diamond 137. If ICODE does not equal 2, then a test is made as indicated in decision triangle 139 to determine whether ICODE is equal to 3, and if not, the test is then made to determine whether the Time-to-Finish is greater than 4, as indicated in decision diamond 141. If the Time-to-Finish is not greater than 4 cycles, then control is returned through the freeze equal zero oval 137 to the condition wherein the arithmetic element start register is set to 2 as indicated in block 129. If the ICODE equals 3, as determined in decision diamond 139, then the test is made to determine whether the Time-to-Finish is greater than 3 as shown in decision diamond 143. If the Time-to-Finish is not greater than 3, then freeze remains at zero as shown in oval 137 and control is returned again to the situation wherein the arithmetic element start register is set to two as shown in block 129. When the ICODE test equals 2, as shown in decision diamond 137, then a test is made to determine whether the Time-to-Finish is greater than 2 as shown in decision diamond 145. If the Time-to-Finish is not greater than 2, then the freeze remains at zero, as shown at oval 137 and the arithmetic element start register is set to 2 as shown in block 129.

When the ICODE is equal to zero as indicated in decision block 133, then a test is made to determine whether the Time-to-Finish is greater than zero as indicated in decision diamond 147. If the Time-to-Finish is greater than zero, as indicated in decision diamond 147, or greater than 2 as indicated in decision diamond 145 or greater than 3 as indicated in decision diamond 143, then the freeze is set equal to one as indicated in oval 149 and the arithmetic start register is set equal to 3 as shown in block 151. The conditions that follow block 151 set CDS and MS=1 as shown in oval 153 and return control to the test point of decision diamond 133. When the ICODE is equal to zero, as indicated by decision diamond 133, and the Time-to-Finish is not greater than zero, as indicated by decision diamond 147, then the freeze is set to zero as indicated by oval 149 and control is returned to the start position indicated by start circle 101 as indicated in FIG. 4B and also in FIG. 4A.

A few examples of actual template flow will be illustrative as to the system operation. In FIG. 5, a timing chart is provided showing the flow of a triad template $z=(A\ OP1\ B)\ OP2C$. As can be seen in Time 1 operand A is read out of Stage 1. In Time 2 B is read out of Stage 1 and A is aligned in Stage 2. In Time 3 C is read out of Stage 1 and B is aligned in Stage 2. In Time 4, C is aligned in Stage 2 and operand one with an ICODE of 6 performs in Stage 3. In Time 5 OP1 with ICODE of zero is performed in Stage 3. In Time 6 an OP code of 2 with an ICODE of 6 is performed in Stage 3. In Time 7 an OP 2 with an ICODE of zero is performed in Stage 3. In Time 8 resultant Z is aligned in Stage 4 and in Time 9 resultant Z is fed into Stage 1. In FIG. 5 the OP1 and OP2 are operational commands provided by the template parameter register 33 and selected by the operator select multiplexer 37.

In FIG. 6 the timing operation is shown for the triad $z=(A+B)$ times C. As can be appreciated, this triad is in essence the same triad as shown in FIG. 5 with operation 1 selected as addition and operation 2 selected as multiplication. The addition and multiplication microinstructions are fed to the pipeline Stage 3 unit from the operator micromemory 61.

In FIG. 7 the timing diagram is shown for the triad $Z(A\times B)$ minus C. It is noted that this triad is the same as that shown in FIG. 5 with multiplication selected for operation 1 and subtraction selected for operation 2.

FIG. 8 shows the timing diagram for the triad Z equals $(A+B)/C$. This is the same triad as shown in FIG. 5 with addition selected for operation 1 and division selected for operation 2. It can be seen that the division operation consumes four cycles and that a freeze denoted by the letters FR is imposed on Stage 1, Stage 2, and Stage 4 during cycle times 7 and 8. During this time the freeze logic circuits 49, 51, and 53 are inhibited from initiating any new operations on the respective stages and the template micromemory structure 23 along with the control word registers 41, 43, 45, and 47 are inhibited or "frozen" from making any further transfers during these cycles.

It will be appreciated that while only specific embodiments of the present invention and methods of practicing the same have been described and illusrated, changes and modifications therein will be apparent to one skilled in the art. The above description of the illustrated embodiment of the invention has been by way of example only and should not be taken as a limitation upon the scope of the invention.

What is claimed is:

1. An operator independent template control architecture for providing microinstructions to a plurality of stages and operation microcode to a particular stage in a microprogrammable pipelined data processing system, said architecture comprising:

micromemory structure means storing a plurality of microinstructions, said micromemory structure means for providing a microinstruction to each stage in said plurality of stages in said microprogrammable pipelined data processing system, said providing being sequenced with data flow therethrough, said micromemory structure means also storing operation code selection data;

template parameter store means storing a plurality of operation codes for a particular stage in said plurality of stages;

selection means fed by said template store means and controlled by operation code selection data from said micromemory structure means, said selection means selecting a particular one of said plurality of operation codes;

translation means fed by said selection means for translating said selected particular one of said plurality of operation codes into a operation microcode for specifying an operation to be executed in said particular stage in said plurality of stages in said microprogrammable pipelined data processing system; and coordination means receiving said microinstruction for each stage from said micromemory structure means and said operation microcode from said translation means, said coordination means for providing said operation microcode to said particular stage in said plurality of stages coincident with the providing of a microinstruction thereto by said micromemory structure means.

2. The operator independent template control architecture of claim 1 wherein:

said template parameter store means includes a register for storing said plurality of operation codes, and said selection means includes a multiplexer inputted by said register and controlled by operation code selection data from said selection means for selecting a particular one of said plurality of operation codes.

3. The operator independent template control architecture of claim 1 wherein said translation means includes an operation micromemory for storing a plurality of operation microcodes, said operation micromemory addressable by said selection means for reading out therefrom said operation microcode for specifying said operation to be executed.

4. The operator independent template control architecture of claim 3 wherein said operation micromemory is a read-only memory.

5. The operator independent template control architecture of claim 1 wherein said coordination means for providing said operation microcode to said particular stage includes means for freezing the providing of said microinstruction for each other stage in said plurality thereof by said micromemory structure means, whereby a relatively long operation may be executed in said particular stage while maintaining data flow and microinstruction provision coordination in all stages of the microprogrammable pipelined data processing system.

* * * * *